(12) United States Patent
Evans

(10) Patent No.: US 7,739,688 B1
(45) Date of Patent: Jun. 15, 2010

(54) TECHNIQUES FOR MANAGING DISTRIBUTION OF WELL-DEFINED OBJECTS IN A CLIENT/SERVER SYSTEM

(75) Inventor: T. David Evans, Rutland, MA (US)

(73) Assignee: EMC Corporation, Hopkinton, MA (US)

( * ) Notice: Subject to any disclaimer, the term of this patent is extended or adjusted under 35 U.S.C. 154(b) by 1200 days.

(21) Appl. No.: 11/325,146

(22) Filed: Jan. 3, 2006

(51) Int. Cl.
*G06F 13/00* (2006.01)

(52) U.S. Cl. .............. 719/316; 719/330; 709/219; 709/231; 707/10

(58) Field of Classification Search .......... 719/316, 719/330; 709/219, 231; 707/10
See application file for complete search history.

(56) References Cited

U.S. PATENT DOCUMENTS

| | | | |
|---|---|---|---|
| 5,522,077 A * | 5/1996 | Cuthbert et al. ......... | 707/103 R |
| 6,453,362 B1 * | 9/2002 | Bittinger et al. ......... | 719/316 |
| 7,003,554 B1 | 2/2006 | Turner et al. | |
| 7,055,147 B2 | 5/2006 | Iterum et al. | |
| 7,131,126 B2 | 10/2006 | Yamamoto | |
| 7,143,164 B2 | 11/2006 | Antonov et al. | |
| 2002/0099798 A1 * | 7/2002 | Fedorovsky et al. ......... | 709/219 |
| 2006/0031420 A1 * | 2/2006 | Ferguson et al. ............ | 709/219 |

\* cited by examiner

*Primary Examiner*—Andy Ho
(74) *Attorney, Agent, or Firm*—BainwoodHuang

(57) ABSTRACT

A technique enables managing distribution of well-defined objects. The technique involves maintaining a database of well-defined objects and a registry of identifiers. The technique further involves receiving an object request from a client device. The object request includes a particular identifier. The technique further involves providing (i) all of the well-defined objects from the database in response to the well-defined object request when the particular identifier of the well-defined object request is at least as recent as the most recent identifier in the registry, and alternatively (ii) less than all of the well-defined objects from the database in response to the well-defined object request when the particular identifier of the well-defined object request is not as recent as the most recent identifier in the registry. Accordingly, an older client device can be prohibited from receiving a newer well-defined object thereby preventing the older client device from attempting to construct the newer object and inadvertently failing.

21 Claims, 4 Drawing Sheets

TECHNIQUES FOR MANAGING DISTRIBUTION OF WELL-DEFINED OBJECTS IN A CLIENT/SERVER SYSTEM

BACKGROUND

In some conventional client/server architectures which are equipped for operation in the object oriented paradigm, a client sends a request to a server, and the server streams well-defined objects (i.e., objects with no direct ties to other objects) back to the client in response to the request. Once the client receives these well-defined objects, the client is equipped to operate in accordance with these objects.

Unfortunately, the possibility exists that a user could attempt to operate an older versioned client with a more recently developed server. That is, (i) the user may upgrade the server so that the server now is configured to provide both the original well-defined objects as well as new well-defined objects, but (ii) the user may not concurrently upgrade the client. Rather, the user may inadvertently forget to upgrade the client, the user may purposefully avoid upgrading the client with a desire to continue to use the client in a legacy manner, etc.

In such a situation, the older versioned client would send a request to the more recently developed server. The more recently developed server would respond to the request by providing a stream of well-defined objects which includes both the original well-defined objects as well as the new well-defined objects. However, the client would not be able to construct the new well-defined objects and would thus fail to process the stream of well-defined objects properly.

To avoid such a failure, the user may employ a variety of approaches. One approach (hereinafter referred to as the "common version approach") involves the user adding new well-defined objects to the client/server architecture only if the user is able to contemporaneously upgrade both the client and the server in order to maintain the client and the server at a common version. For example, suppose that the client is one year old and needs to have functionality with a newer server. Under this approach, the user avoids (i.e., defers) upgrading the server so that the server only streams well-defined objects that are one year old (or older). Such upgrade deferment of the server (i.e., the server and the client continuously reside at a common version) prevents the server from streaming a newer well-defined object to the client that would otherwise cause the client to fail.

Another approach (hereinafter referred to as the "embedded approach") involves the user adding new well-defined objects to the server, but configuring the server to stream the new well-defined objects to clients piece by piece as atomic items embedded in an older well-defined object. If a client knows of the new well-defined objects, that client recomposes the well-defined objects by knowing the appropriate order of the streamed atomic items. That is, this "newer" client recognizes the pieces when the pieces get streamed. On the other hand, a client that does not know of the new objects ignores the pieces. That is, this "older" client simply "drops the pieces on the floor" so to speak. Accordingly, the older client will not attempt to construct an unrecognized object that would otherwise cause the older client to fail.

Yet another approach (hereinafter referred to as the "no-longer supported approach") involves the server being upgraded with new well-defined objects indiscriminately. During the server upgrade, the server receives a new well-defined subsystem representation (e.g., a new version number). If an older client targets the server but does not recognize the new subsystem representation, the older client receives data telling the older client that client's subsystem is no longer supported. That is, the older client is not provided with a stream of well-defined objects thus preventing the older client from attempting to construct an unrecognized object and failing. This is often the route taken by manufacturers with a new hardware platform where the customer is required to upgrade the client software simultaneously with the server software in order to for the client to remain supported.

SUMMARY

Unfortunately, there are deficiencies to the above-described conventional approaches to preventing a client from attempting to construct an unrecognized object and failing. For example, in the above-described conventional common version approach, there are significant maintainability issues. In particular, engineers may need to add functionality to existing software but nevertheless be prevented from adding such functionality until the client is available for upgrading. Until the older client is upgraded, the server is prevented (i.e., held back) from receiving the newer well-defined objects to support newer clients. Moreover, this conventional common version approach requires extra training time to be spent on new engineers since this approach is not an intuitive concept in the object oriented paradigm.

Additionally, in the above-described conventional embedded approach, the engineers are significantly burdened with the tasks of (i) embedding new well-defined objects as atomic items embedded in an older well-defined object on the server, and (ii) configuring clients to recompose the well-defined objects on the client. Accordingly, not only does the embedded approach take substantially more time and effort to implement, the embedded approach adds a great deal of complexity to the code. Also, there is the fact that the server will still send new atomic pieces to old clients needlessly, thereby consuming resources that could be put to better use doing other work.

Furthermore, in the above-described conventional no-longer supported approach, a client which is no-longer supported will suffer from a decided lack of client functionality. In particular, the client will be unable to obtain any well-defined objects from the server until the client is upgraded. Under this approach, the client is essentially coerced into receiving a software upgrade thus preventing server from supporting legacy equipment.

In contrast to the above-described conventional approaches to preventing a client from attempting to construct an unrecognized object and ultimately failing, an improved technique involves distribution management of well-defined objects using a client-provided identifier. The use of such an identifier enables a server to be aware of the client's limitations. Once the server knows which well-defined objects the client can and cannot handle, the server streams only those well-defined objects that the client is capable of handling. As a result, the client does not receive a newer well-defined object that the client cannot construct thus preventing the client from inadvertently failing.

One embodiment is directed to a technique for managing distribution of well-defined objects from a server device. The technique involves maintaining a database of well-defined objects and a registry of identifiers. The technique further involves receiving a well-defined object request from a client device. The well-defined object request includes a particular identifier. The technique further involves providing (i) all of the well-defined objects from the database to the client device in response to the well-defined object request when the particular identifier of the well-defined object request is at least as recent as the most recent identifier in the registry, and alternatively (ii) less than all of the well-defined objects from the database to the client device in response to the well-defined object request when the particular identifier of the well-defined object request is less recent than the most recent identifier in the registry. Accordingly, an older client device can be prohibited from receiving a newer well-defined object from the server device based on that older client device's identifier thereby preventing that older client device from attempting to construct the newer object and inadvertently failing.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved technique involves management of the distribution of well-defined objects using a client-provided identifier. The use of such an identifier enables a server to be aware of the client's limitations. Once the server knows which well-defined objects the client can and cannot handle, the server streams only those well-defined objects that the client is capable of handling. As a result, the client does not receive a newer well-defined object that the client cannot construct thus preventing the client from inadvertently failing.

Figure 1:
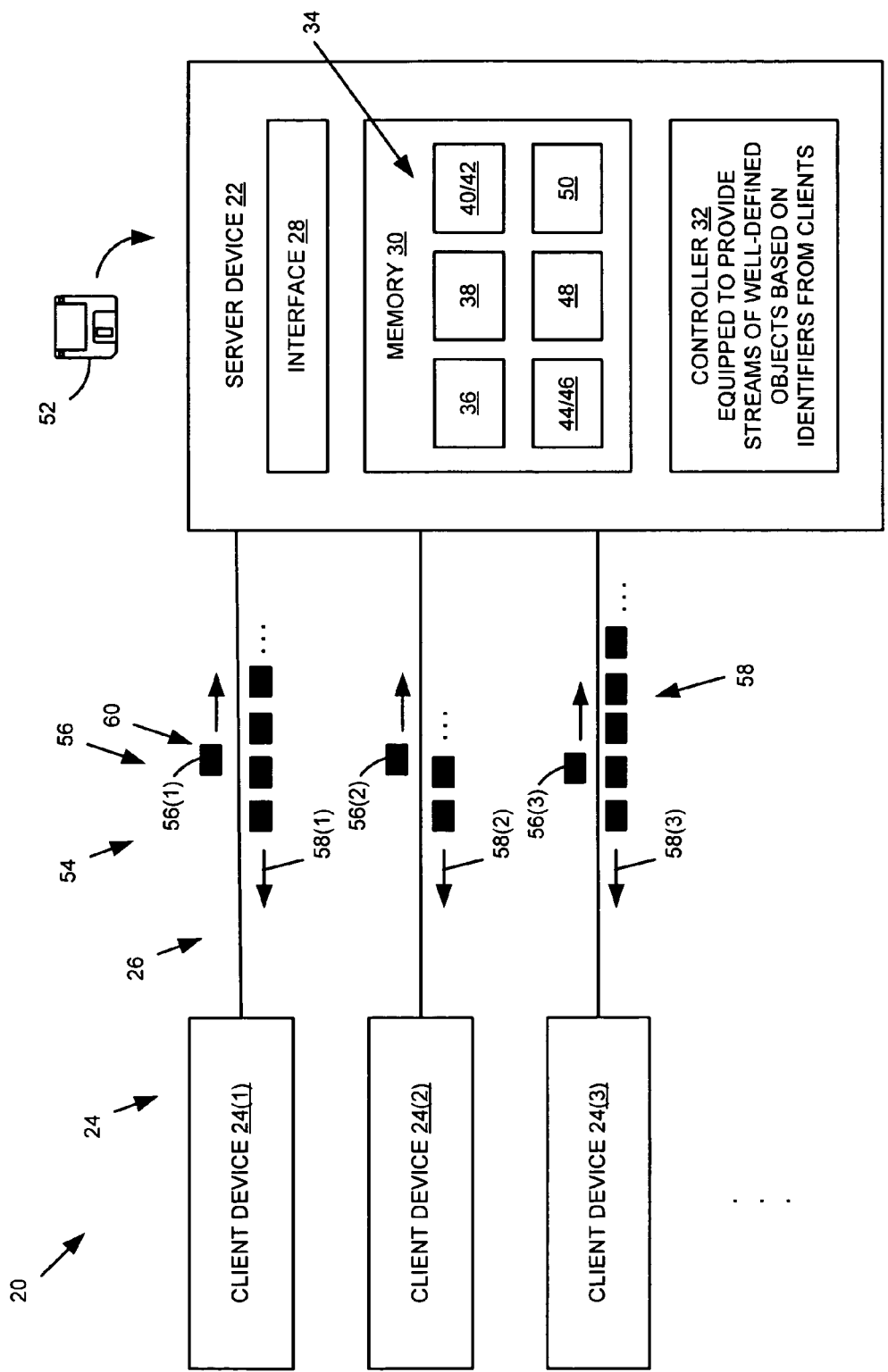
FIG. 1 is a block diagram of a system which is configured to manage distribution of well-defined objects using a client-provided identifier.

FIG. 1 shows a client/server system 20 which is configured to manage distribution of well-defined objects using a client-provided identifier. The use of such an identifier allows a server to prohibit an older client from receiving a newer but unsupported well-defined object when the server responds to a request for well-defined objects. That is, the server sends only well-defined objects that the server knows the older client can handle and does not send the newer well-defined object that the client cannot handle. Since the newer well-defined object is not sent to the older client, the older client is prevented from attempting to construct the newer object and otherwise failing.

As shown in FIG. 1, the client/server system 20 includes a server device 22, multiple client devices 24(1), 24(2), 24(3), . . . (collectively, client devices 24), and a communications medium 26 which enables the server 22 to exchange information with the client devices 24. The server device 22 includes an interface 28, memory 30 and a controller 32. The memory 30 is configured to store a variety of memory constructs 34 including, among other things, an operating system 36, an application 38, a registry 40 of identifiers 42, a database 44 of well-defined objects 46, global shared object information (e.g., global memory) 48, and linked libraries 50.

The various memory constructs 34 are capable of being delivered to the server device 22 in a variety of ways including installation from a computer program product 52. In this arrangement, the server device 22 includes computerized equipment (e.g., a set of processors, computer memory, etc.). As shown in FIG. 1, the computer program product 52 includes a computer readable medium having instructions which direct the operation of the server device 22. Although the computer program product 52 is illustrated in FIG. 1 as a diskette by way of example only, a variety of storage and communications media are suitable for use (e.g., a set of CD-ROMs, tapes, memory cards or sticks, network downloads, propagated signals, combinations thereof, and so on).

During operation of the client/server system 20, the server device 22 runs the operating system 36 and the application 38 to perform operations in a well-organized manner. In some arrangements, the controller 32 (e.g., one or more processors) executes code of the operating system 36 and the application 38 from the memory 30, and communicates externally with the client devices 24 through the interface 28. As a result, the controller 32 is able to share server resources among multiple processes in a multitasking manner and thus service the client devices 24 concurrently.

During such operation, the client devices 24 individually perform respective startup routines and then initiate communications 54 with the server device 22 over the communications medium 26. Such initial communications 54 involve (i) the client devices 24 transmitting requests 56 for well-defined objects to the server device 22, and (ii) the server device 22 (under direction of the operating system 36 and the application 38) responding to the requests 56 with respective streams 58 of well-defined objects 46 from the database 44. For example, as shown in FIG. 1, the client device 24(1) sends a request 56(1) to the server device 22. In response to the request 56(1), the server provides a stream 58(1) of well-defined objects 46 from the database 44 back to the client device 24(1). Similarly, the client device 24(2) sends a request 56(2) to the server device 22, and the server device 22 provides a stream 58(2) of well-defined objects 46 from the database 44 to the client device 24(2) in response to the request 56(2). Additionally, the client device 24(3) sends a request 56(3) to the server device 22, and the server device 22 provides a stream 58(3) of well-defined objects 46 from the database 44 to the client device 24(3) in response to the request 56(3), and so on.

At this point, it should be understood that the well-defined object request 56 from each client device 24 includes a respective client-provided identifier 60. The server device 22 is capable of determining which well-defined objects 46 to stream to that client device 24 based on that client-provided identifier 60. In particular, when the server device 22 receives a request 56 from a client device 24, the controller 32 of the server device 22 compares the client-provided identifier 60 within the received request 56 to the registry 40 of identifiers 42. Based on this comparison, the controller 32 knows which well-defined objects 46 are supported by the client device 24. The server device 22 then streams, to the client device 24, only those well-defined objects 46 that are supported by the client device 24.

Such operation stops the server device 22 from sending the client device 24 a well-defined object 46 that the client device 24 cannot construct and thus preventing the client device 24 from inadvertently failing. To illustrate the feature of the client devices 24 receiving streams 56 of well-defined objects 46 that could include different well-defined objects 46 due to the client devices 24 being configured with different-versioned software, the streams 56(1), 56(2), 56(3) of well-defined objects 46 in FIG. 1 are shown as having different lengths.

This manner of operating is well-suited for a data storage system (e.g., a server device) having multiple storage processors running agents configured to support multiple different-versioned external hosts (e.g., client devices) in the object oriented paradigm. For example, suppose that the external hosts are configured to send requests to the storage processors upon startup, and that the storage processors are configured to stream well-defined objects from a database to the external hosts in response to the requests. In particular, upon receipt of each request, a storage processor compares an identifier in the request to a registry of identifiers to determine which well-defined objects to stream.

Initially, the storage processors and the external hosts are at the same version level (or number). Accordingly, the storage processors stream all of the well-defined objects from the database to the external hosts since the storage processors and the external hosts are at a common version level and thus fully compatible (i.e., the external hosts are capable of constructing all of the well-defined objects).

However, now suppose that a user upgrades only the storage processors by adding new well-defined objects to the database, but does not upgrade the client devices with new corresponding software. There is still no risk of the storage processors receiving requests from older external hosts and inadvertently stream the new well-defined objects from the database to the older external hosts which are not configured to construct the new well-defined objects. Rather, the storage processors examine the identifiers in the requests and generate the streams of well-defined objects based on the identifiers. Accordingly, upon examination, the storage processors are capable of determining that the older external hosts are unable to handle construction of the new well-defined objects and thus send only the appropriate well-defined objects to the older external hosts. As a result, the older external hosts are capable of obtaining well-defined objects from the storage processors (i.e., less that all of the well-defined objects from the database) and continuing to operate with their existing functionality in a legacy manner. Further details will now be provided with reference to FIG. 2.

Figure 2:
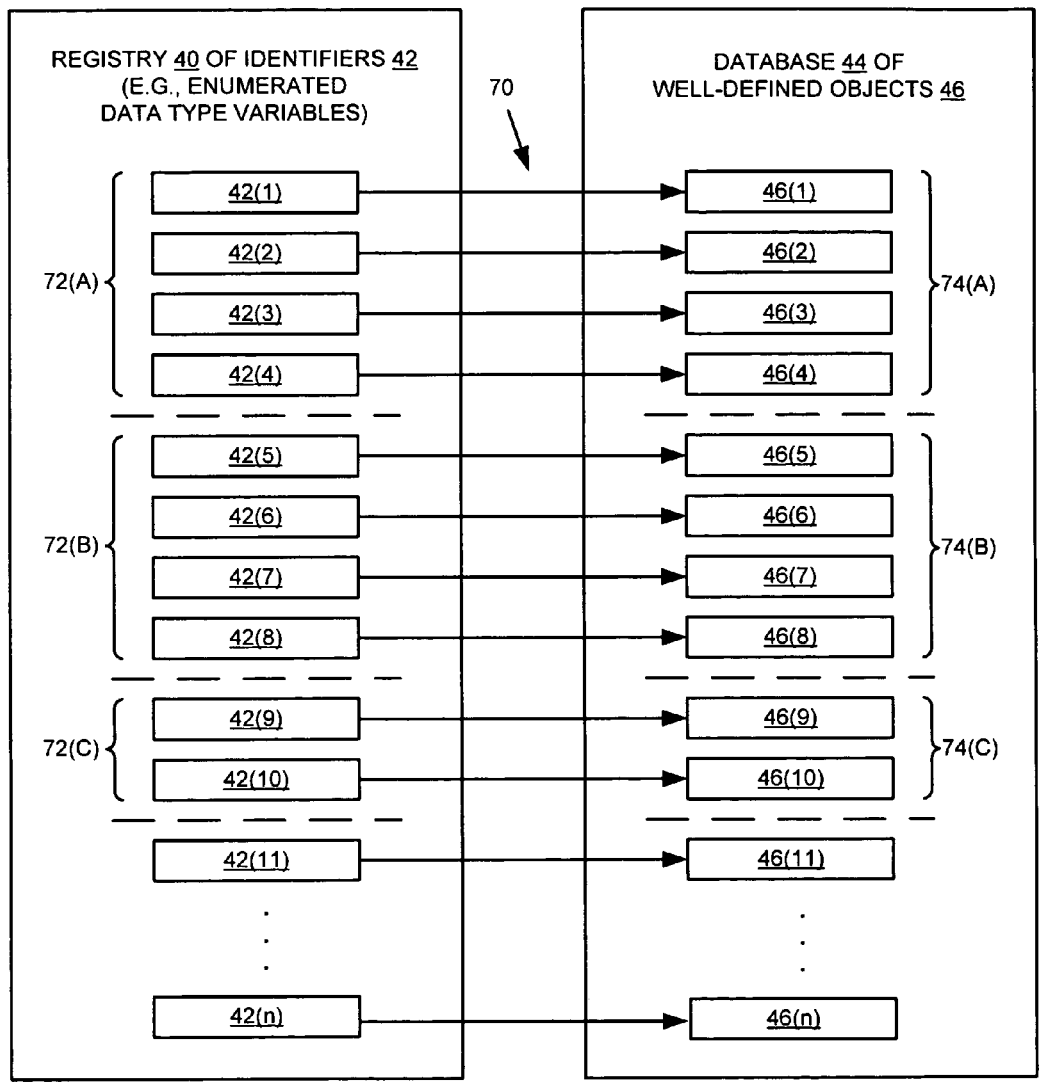
FIG. 2 is a block diagram of an identifier registry which is maintained by a server device of the system of FIG. 1.

FIG. 2 is a block diagram of the registry 40 of identifiers 42(1), . . . , 42(n) (collectively, identifiers 42) and the database 44 of well-defined objects 46(1), . . . , 46(n) (collectively, well-defined objects 46) which are maintained by the server device 22. As shown by the arrows 70, each identifier 42 of the registry 40 is logically associated with a corresponding well-defined object 46 of the database 44. In particular, the identifier 42(1) refers to the well-defined object 46(1), the identifier 42(2) refers to the well-defined object 46(2), and so on.

It should be further understood that registry 40 may have initially included only a set 72(A) of identifiers 42 (i.e., identifiers 42(1), 42(2), 42(3) and 42(4)) and that the database 44 may have initially included only a set 74(A) of well-defined objects 46(1), 46(2), 46(3) and 46(4)). At a later time (illustrated in FIG. 2 by a set of dashed lines), the user may have upgraded the server device 22 by adding a second set 72(B) of identifiers 42 to the registry 40 (i.e., identifiers 42(5), 42(6), 42(7) and 42(8)) and a second set 74(B) of well-defined objects 46 to the database 44 (i.e., well-defined objects 46(5), 46(6), 46(7) and 46(8)). During the upgrade, the controller 32 of the server device 22 appends the second set 72(B) of identifiers 42 to the registry 40 and includes the second set 74(c) of well-defined objects 46 in the database 44. Since the registry 40 can be implemented as a series of enumerated data type values, the controller 32 can simply extend the series with additional enumerated data type values.

Similarly, at yet a further time in the future (illustrated in FIG. 2 by another set of dashed lines), the user may have upgraded the server device 22 by adding a third set 72(C) of identifiers 42 to the registry 40 (i.e., identifiers 42(9) and 42(10)) and a third set 74(C) of well-defined objects 46 to the database 44 (i.e., well-defined objects 46(9) and 46(10)). Again, during this upgrade, the controller 32 appends the third set 72(C) of identifiers 42 to the registry 40 and includes the second set 74(C) of well-defined objects 46 in the database 44. This process is repeated for each upgrade of the server device 22 (see the identifier 42(11) and the well-defined object 46(11)).

It should be understood that the registry 40 is a range of identifiers 42 with the identifier 42(1) being the starting point identifier of that range. Originally, the identifier 42(4) was the end point identifier, i.e., the "server highest supported identifier" (SHSID). The end point identifier, SHSID, indicates a most recent version of well-defined objects 46 supported by the server device 22, e.g., well-defined objects 46(1), . . . , 46(4) if the identifier 42(4) is the SHSID.

At the time immediately following the addition of the second set 72(B) of identifiers 42 and the second set 74(B) of well-defined objects 46, the identifier 42(1) is still the starting point identifier for the range but the identifier 42(8) became the new end point identifier (SHSID). At this point, the server device 22 is capable of providing well-defined objects 46(1), . . . 46(8) since the well-defined objects 46(1), . . . 46(8) now reside in the database 44.

Likewise, at the time immediately following the addition of the third set 72(C) of identifiers 42 and the third set 74(B) of well-defined objects 46, the identifier 42(1) is still the starting point identifier but the identifier 42(10) became the new end point identifier (SHSID) of the range, and so on. Here, the server device 22 is capable of providing well-defined objects 46(1), . . . 46(10) since the well-defined objects 46(1), . . . 46(10) now reside in the database 44. Further details will now be provided with reference to FIG. 3.

Figure 3:
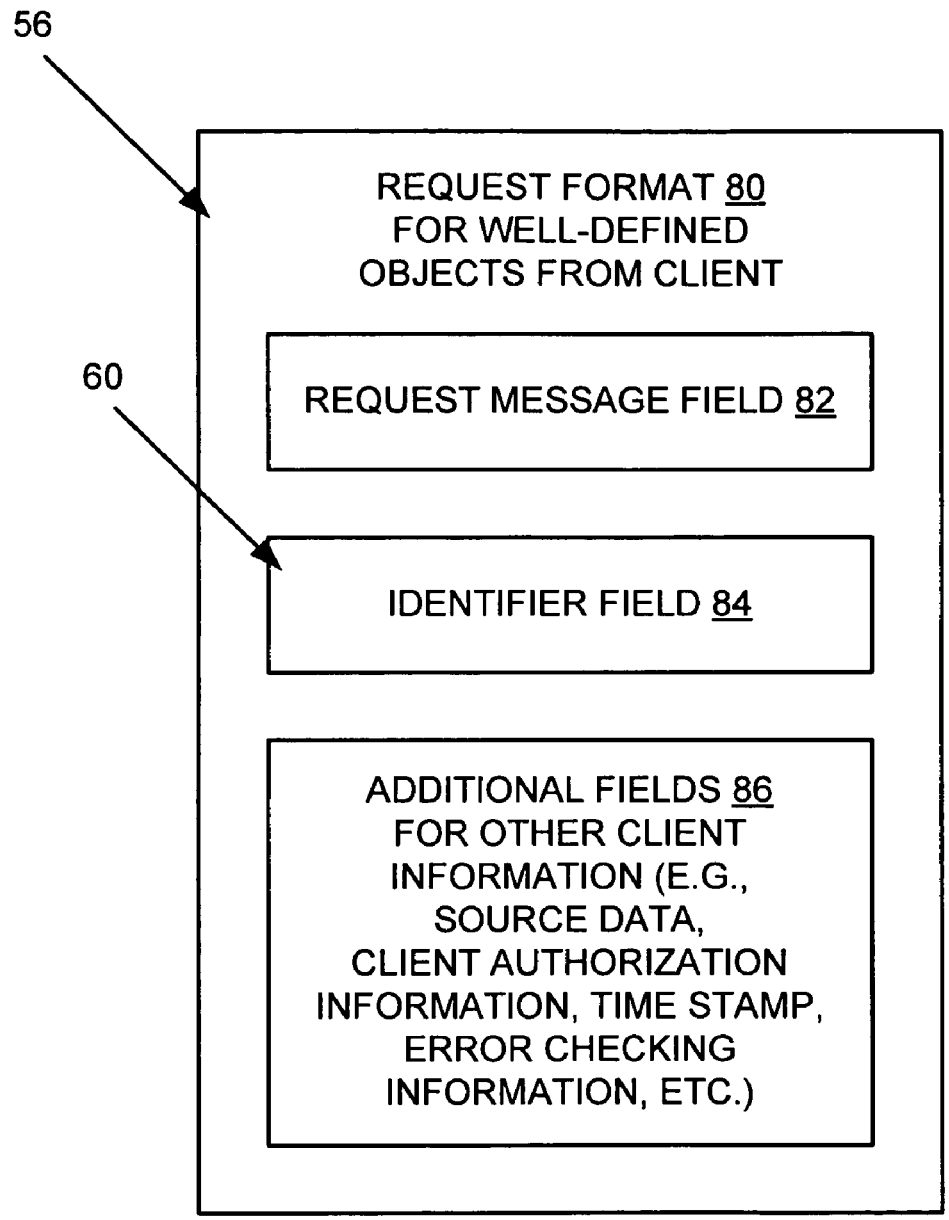
FIG. 3 is a block diagram of a request which is provided to the server device by a client device of the system of FIG. 1.

FIG. 3 is a block diagram of a format 80 for a request 56 which is provided to the server device 22 by each client device 24 when that client device 24 requests a stream 58 of well-defined objects 46 from the server device 22. The request format 80 includes a request message field 82, an identifier field 84, and additional fields 86. The request message field 82 includes a value that uniquely indicates that the request 56 is for a stream 58 of well-defined objects 46 among other types of messages (e.g., a message simply requesting updates). The identifier field 84 includes the earlier-described client-provided identifier 60 (e.g., an enumerated data type value). The additional client information fields 86 provide other client-related information such as client data (e.g., an IP address of the client, client authorization or authentication data, a time stamp, error checking and/or correction information, etc.).

It should be understood that, upon receipt of the request 56 by the server device 22 from a client device 24, the controller 32 reads the contents of the identifier field 84 and interprets the contents as that client device's highest supported identifier (CHSID), i.e., the most recent version of well-defined objects 46 supported by the requesting client device 24. As such, the server device 22 is capable of determining which well-defined objects 46 are supported by the client device 24 and which are not.

For example, with reference to FIGS. 1-3, suppose that the client device 24(1) has was originally configured to handle well-defined objects 46(1), . . . , 46(4) from the server device 22 but no newer well-defined objects. In this case, the client device 24(1) sends the request 56(1) to the server device 22 with the value for identifier 42(4) as the client-provided identifier 60 in the identifier field 84, i.e., the CHSID for the client device 24(1). When the server device 22 receives the request 56(1), the server device 22 provides a stream 58(1) containing only well-defined objects 46(1), ..., 46(4) to the client device 24(1). Along these lines, the controller 32 simply bounds (or alternatively traverses) the registry 40 from the starting point to the particular identifier 42(4), outputs only the well-defined objects 46 associated with the bound (or alternatively traversed) identifiers (i.e., objects 46(1), ... 46(4) corresponding to identifiers 42(1), ..., 42(4)), and does not output any well-defined objects 46 associated with unbound (or alternatively non-traversed) identifiers 42 (i.e., objects 46(5), ... 46(n) corresponding to identifiers 42(5), ..., 42(n)). A similar operation applies for each of the other client devices 24 as well.

As an additional example, suppose that the user upgrades the client device 24(1) so that the client device 24(1) is now capable of constructing well-defined objects 46(1), ..., 46(8). When the client device 24(1) wishes to obtain well-defined objects 46 from the server device 22 (e.g., at startup), the client device 24(1) sends the request 56(1) to the server device 22 with the value for identifier 42(8) as the client-provided identifier 60 in the identifier field 84, i.e., the new CHSID for the client device 24(1). When the server device 22 receives the request 56(1), the server device 22 provides a stream 58(1) containing only well-defined objects 46(1), ..., 46(8) to the client device 24(1), and so on.

If a client device 24 is at a lower version level relative to the server device 22 (i.e., the identifier 60 is not the most recent identifier in the registry 40), the server device 22 provides less than all of the well-defined objects 46 from the database 44 to the client device 24 thus enabling the client device 24 to have at least its original functionality, i.e., the client device 24 may be legacy equipment. However, if the client device 24 is at least at the same version level as the server device 22, the server device 22 provides all of the well-defined objects 46 from the database 44 to the client device 24 thus enabling the client device 24 to enjoy full functionality.

In some arrangements, the controller 32 is configured to store the request 56 for well-defined objects 46 from each client device 24 in the global memory 48. Such storage allows the linked libraries 50 to readily access the CHSID of the client devices 24 without further communication with the client devices 24. Further details will now be provided with reference to FIG. 4.

Figure 4:
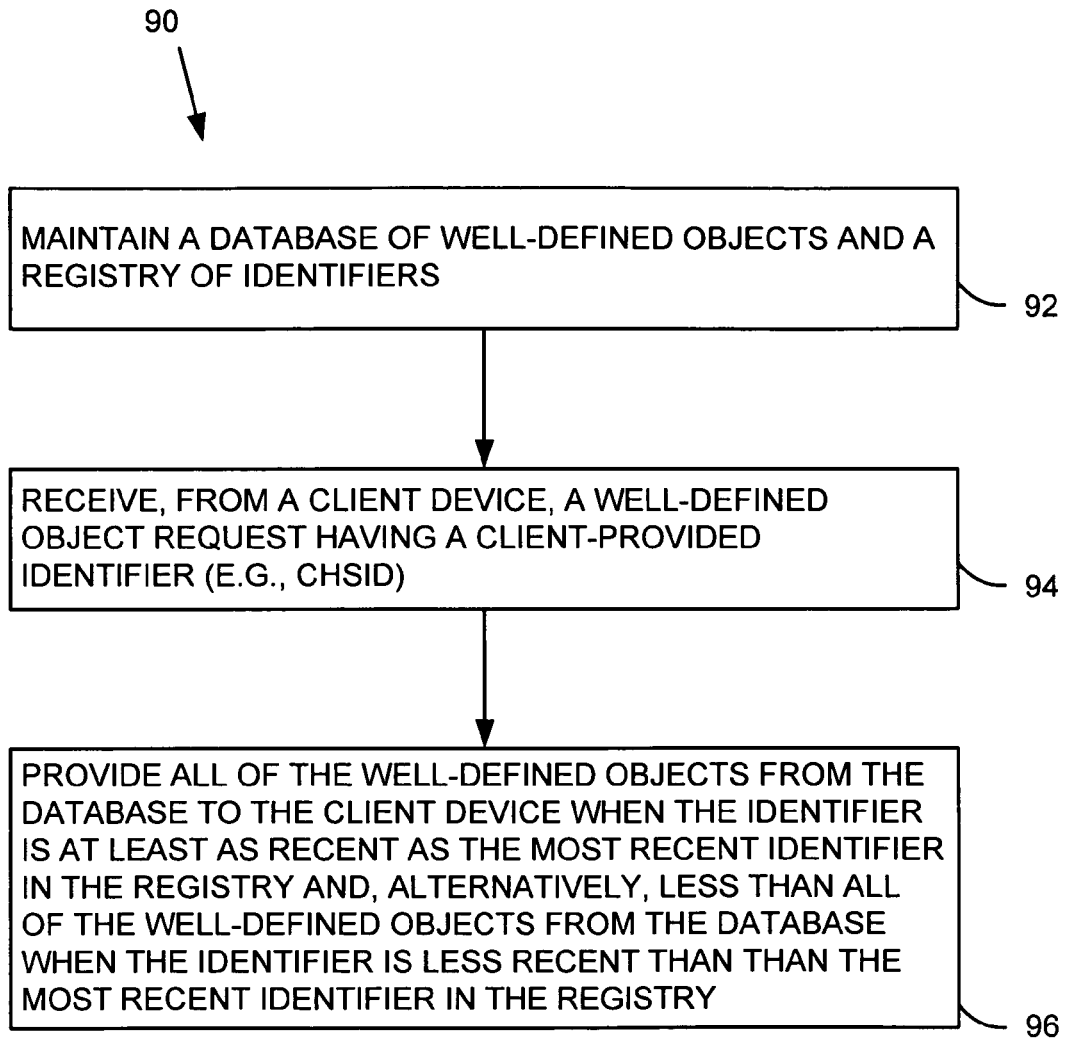
FIG. 4 is a flowchart of a procedure which is performed by the server device of the system of FIG. 1.

FIG. 4 is a flowchart of a procedure 90 describing operation of the server device 22. In step 92, the server device 22 maintains the database 44 of well-defined objects 46 and the registry 44 of identifiers 46. Although such maintenance is illustrated in a step 92 which precedes other steps, it should be understood that such maintenance occurs in an ongoing manner throughout the operation of the server device 22.

In step 94, the server device 22 receives a well-defined object request 56 from a client device 24. The request 56 includes, among other things, a client-provided identifier 60 indicating the highest supported identifier 60 (CHSID) and well-defined object 46 for that client device 24. In some arrangements, the identifier 60 is an enumerated data type.

In step 96, the server device 22 provides a stream 58 of well-defined objects 46 from the database 44 to the client device 24 through the interface 28 and the communications medium 26 (also see FIG. 1). The stream 58 includes all of the well-defined objects 46 in the database 44 when the identifier 60 is at least as recent as the most recent identifier 42 in the registry 40. However, the stream 58 includes less than all of the well-defined objects 46 in the database 44 when the identifier 60 is not as recent as the most recent identifier 42 in the registry 40, e.g., well-defined objects 46(1)-46(4) if the client-provided identifier 60 matches the identifier 42(4) in the registry 40, well-defined objects 46(1)-46(8) if the client-provided identifier 60 matches the identifier 42(8) in the registry 40, well-defined objects 46(1)-46(10) if the client-provided identifier 60 matches the identifier 42(10) in the registry, and so on. Accordingly, the server device 22 only provides well-defined objects 46 to the client device 24 that the client device 24 is capable of constructing.

As described above, an improved technique involves management of the distribution of well-defined objects 46 using a client-provided identifier 60. The use of such an identifier 60 enables a server device 22 to be aware of the client device's limitations. Once the server device 22 knows which well-defined objects 46 the client device 24 can and cannot handle, the server device 22 streams only those well-defined objects 46 that the client device 24 is capable of handling. As a result, the client device 24 does not receive a newer well-defined object 46 that the client device 24 cannot construct thus preventing the client device 24 from inadvertently failing.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the client/server system 20 was described above as being a data storage system by way of example only. The client/server system 20 is well-suited for managing distribution of well-defined objects 46 in other contexts as well such as in general computing environments, custom application settings, etc.

What is claimed is:

1. A server device, comprising:
    an interface;
    memory; and
    a controller coupled to the interface and to the memory, the controller being configured to:
        maintain, within the memory, a database of well-defined objects and a registry of identifiers,
        receive a well-defined object request from a client device through the interface, the well-defined object request including a particular identifier, and
        provide (i) all of the well-defined objects from the database to the client device through the interface in response to the well-defined object request when the particular identifier of the well-defined object request is a most recent identifier in the registry, and alternatively (ii) less than all of the well-defined objects from the database to the client device through the interface in response to the well-defined object request when the particular identifier of the well-defined object request is not the most recent identifier in the registry.

2. A server device as in claim 1 wherein the registry of identifiers is a range of identifiers having a starting point identifier and an end point identifier;
    wherein the range of identifiers includes the particular identifier;
    wherein each identifier is associated with a well-defined object stored in the database; and
    wherein providing includes:
        bounding at least a portion of the range from the starting point to the particular identifier, outputting only well-defined objects associated with the bound identifiers, and not outputting any well-defined objects associated with unbound identifiers.

3. A server device as in claim 2 wherein the controller is further configured to:
   prior to maintaining the registry of identifiers, establish the range of identifiers as a series of enumerated data type variables corresponding to associated well-defined objects in the database.

4. A server device as in claim 3 wherein the controller is further configured to:
   append additional enumerated data type variables to the series of enumerated data type variables, and include additional well-defined objects in the database, the additional well-defined objects being associated with the additional enumerated data type variables appended to the series of enumerated data type variables.

5. A server device as in claim 4 wherein the particular identifier is a server highest supported identifier indicating a most recent version of well-defined objects supported by the server device.

6. A server device as in claim 5 wherein the particular identifier is a client highest supported identifier indicating a most recent version of well-defined objects supported by the client device.

7. A server device as in claim 6 wherein the memory includes global memory which is accessible by linked libraries of the server device; and wherein the controller is further configured to:
   store the well-defined object request from the client device in the global memory to allow the linked libraries to access the client highest supported identifier.

8. In a server device, a method of managing distribution of well-defined objects, the method comprising:
   maintaining a database of well-defined objects and a registry of identifiers;
   receiving a well-defined object request from a client device, the well-defined object request including a particular identifier; and
   providing (i) all of the well-defined objects from the database to the client device in response to the well-defined object request when the particular identifier of the well-defined object request is at least as recent as the most recent identifier in the registry, and alternatively (ii) less than all of the well-defined objects from the database to the client device in response to the well-defined object request when the particular identifier of the well-defined object request is not as recent as the most recent identifier in the registry.

9. A method as in claim 8 wherein the registry of identifiers is a range of identifiers having a starting point identifier and an end point identifier;
   wherein the range of identifiers includes the particular identifier;
   wherein each identifier is associated with a well-defined object stored in the database; and
   wherein providing includes:
      bounding at least a portion of the range from the starting point to the particular identifier, outputting only well-defined objects associated with the bound identifiers, and not outputting any well-defined objects associated with unbound identifiers.

10. A method as in claim 9, further comprising:
    prior to maintaining the registry of identifiers, establishing the range of identifiers as a series of enumerated data type variables corresponding to associated well-defined objects in the database.

11. A method as in claim 10, further comprising:
    appending additional enumerated data type variables to the series of enumerated data type variables, and including additional well-defined objects in the database, the additional well-defined objects being associated with the additional enumerated data type variables appended to the series of enumerated data type variables.

12. A method as in claim 11 wherein the particular identifier is a server highest supported identifier indicating a most recent version of well-defined objects supported by the server device.

13. A method as in claim 12 wherein the particular identifier is a client highest supported identifier indicating a most recent version of well-defined objects supported by the client device.

14. A method as in claim 13 wherein the server device includes global memory which is accessible by linked libraries of the server device; and wherein the method further comprises:
    storing the well-defined object request from the client device in the global memory to allow the linked libraries to access the client highest supported identifier.

15. A computer program product that includes a computer readable medium having instructions stored thereon for managing distribution of well-defined objects, such that the instructions, when carried out by a computerized device, cause the computerized device to:
    maintain a database of well-defined objects and a registry of identifiers;
    receive a well-defined object request from a client device, the well-defined object request including a particular identifier; and
    provide (i) all of the well-defined objects from the database to the client device in response to the well-defined object request when the particular identifier of the well-defined object request is at least as recent as the most recent identifier in the registry, and alternatively (ii) less than all of the well-defined objects from the database to the client device in response to the well-defined object request when the particular identifier of the well-defined object request is less recent than the most recent identifier in the registry.

16. A computer program product as in claim 15 wherein the registry of identifiers is a range of identifiers having a starting point identifier and an end point identifier;
    wherein the range of identifiers includes the particular identifier;
    wherein each identifier is associated with a well-defined object stored in the database; and
    wherein providing includes:
       bounding at least a portion of the range from the starting point to the particular identifier, outputting only well-defined objects associated with the bound identifiers, and not outputting any well-defined objects associated with unbound identifiers.

17. A computer program product as in claim 16 wherein the instructions, when carried out by the computerized device, further cause the computerized device to:
    prior to maintaining the registry of identifiers, establish the range of identifiers as a series of enumerated data type variables corresponding to associated well-defined objects in the database.

18. A computer program product as in claim 17 wherein the instructions, when carried out by the computerized device, further cause the computerized device to:
    append additional enumerated data type variables to the series of enumerated data type variables, and include additional well-defined objects in the database, the additional well-defined objects being associated with the additional enumerated data type variables appended to the series of enumerated data type variables.

19. A computer program product as in claim 18 wherein the particular identifier is a server highest supported identifier indicating a most recent version of well-defined objects supported by the server device.

20. A computer program product as in claim 19 wherein the particular identifier is a client highest supported identifier indicating a most recent version of well-defined objects supported by the client device.

21. A computer program product as in claim 20 wherein the computerized device includes global memory which is accessible by linked libraries of the computerized device; and wherein the instructions, when carried out by the computerized device, further cause the computerized device to:
 store the well-defined object request from the client device in the global memory to allow the linked libraries to access the client highest supported identifier.

* * * * *